(12) United States Patent
McCarthy

(10) Patent No.: US 10,494,573 B2
(45) Date of Patent: Dec. 3, 2019

(54) METHOD FOR CAUSING TIRES TO RECYCLE THEMSELVES

(71) Applicant: Warren Z McCarthy, Salt Lake City, UT (US)

(72) Inventor: Warren Z McCarthy, Salt Lake City, UT (US)

( * ) Notice: Subject to any disclaimer, the term of this patent is extended or adjusted under 35 U.S.C. 154(b) by 80 days.

(21) Appl. No.: 16/181,340

(22) Filed: Nov. 6, 2018

(65) Prior Publication Data

US 2019/0071607 A1  Mar. 7, 2019

(51) Int. Cl.
  *C10G 1/10* (2006.01)
  *C10G 1/00* (2006.01)
  *B29B 17/02* (2006.01)

(52) U.S. Cl.
  CPC ............... *C10G 1/10* (2013.01); *B29B 17/02* (2013.01); *C10G 2300/1003* (2013.01);
  (Continued)

(58) Field of Classification Search
  CPC ....................................................... C10G 1/10
  (Continued)

(56) References Cited

U.S. PATENT DOCUMENTS 5,418,256 A * 5/1995 Dhawan ............... B29B 17/0206
  521/41
5,516,952 A * 5/1996 Lee ........................... C07C 1/00
  585/241
(Continued)

FOREIGN PATENT DOCUMENTS

CN  102504619 A  *  6/2012
CN  106552653 A  *  4/2017
  (Continued)

OTHER PUBLICATIONS

Zhang, X. et. al. "Vacuum Pyrolysis of waste tires with basic additives", Waste Management (2008), 28; pp. 2301-2310. (Year: 2018).*
  (Continued)

*Primary Examiner* — Youngsul Jeong

(57) ABSTRACT

A method for causing used tires to recycle themselves involves chopping used tires to create a feedstock, placing the feedstock within a recycling vessel able to withstand heat and pressure, introducing a caustic agent which will isolate and neutralize or precipitate hazardous substances such as carcinogens and heavy metals, introducing a non-aliphatic hydrocarbon supercritical reactant, raising the interior of the recycling vessel to a desired temperature and pressure to cause the supercritical reactant to enter a supercritical state and effuse into the feedstock where it chemically reacts with the used tire feedstock to release hydrocarbons and other materials from the used tire feedstock, and precipitously dropping pressure within the recycling vessel so that the supercritical reactant exits the used tire feedstock so quickly that it mechanically breaks the used tire feedstock material apart. Temperature within the recycling vessel can be increased by inductively heating the used tire feedstock. Hydrocarbon vapors and liquids which exit the used tire feedstock can be used to fuel a generator which provides electricity to heating by electrical induction. The hydrocarbon vapors and liquids can also be combusted to heat the recycling vessel or to preheat and dewater the used tire feedstock. Other than heavy metal contaminants and carcinogens, the used tire material can be re-used in new products.

20 Claims, 3 Drawing Sheets

(52) U.S. Cl.
CPC ............... *C10G 2300/205* (2013.01); *C10G 2300/4006* (2013.01); *C10G 2300/4012* (2013.01); *C10G 2300/4081* (2013.01)

(58) Field of Classification Search
USPC .......................................................... 585/241
See application file for complete search history.

(56) References Cited

U.S. PATENT DOCUMENTS

| | | | | |
|---|---|---|---|---|
| 8,668,810 | B1* | 3/2014 | Vardanyan | C10B 53/07 201/19 |
| 2016/0045841 | A1* | 2/2016 | Kaplan | B01J 19/0093 429/49 |

FOREIGN PATENT DOCUMENTS

| | | | |
|---|---|---|---|
| CN | 108384287 A | * | 8/2018 |
| KR | 100319350 B1 | * | 1/2002 |

OTHER PUBLICATIONS

Aydin H. et. al. "Fuel production from waste vehicle tires by catalytic pyrolysis and its application in a diesel engine", Fuel Processing Technology, (2011), 92; pp. 1129-1135. (Year: 2011).*

Aydin, H. et. al. "Optimization of fuel production from waste vehicle tires by pyrolysis and resembling to diesel fuel by various desulfurization methods", Fuel, (2012), 102; pp. 605-612. (Year: 2012).*

Definition of "analogue". Merriam Webster; accessed Feb. 15, 2019.*

Giray, E. S. et. al. "Supercritical extraction of scrap tire with different solvents and the effect of tire oil on the supercritical extraction of coal", Fuel Processing Technology, (2004), 85; pp. 251-265. (Year: 2004).*

* cited by examiner

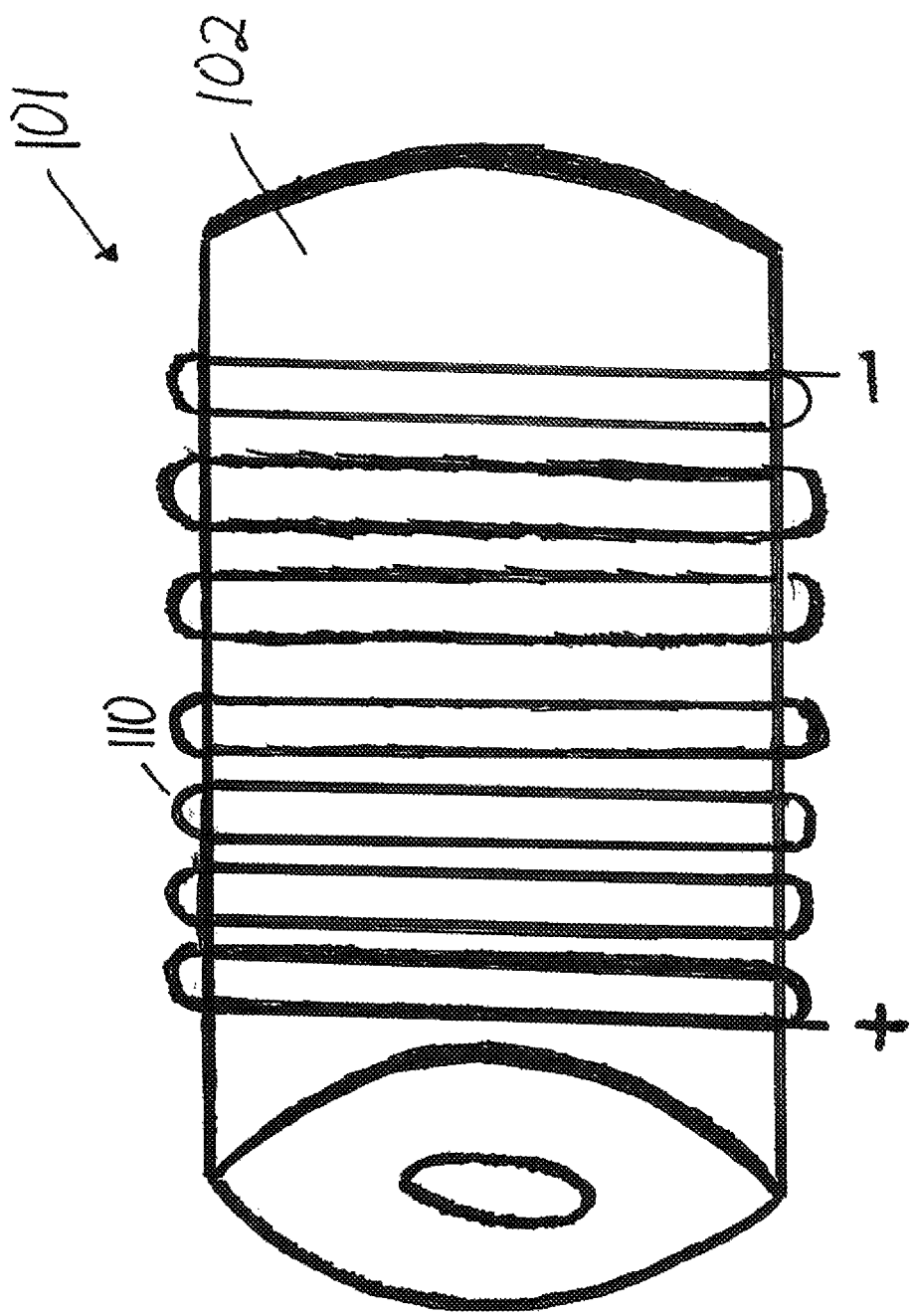

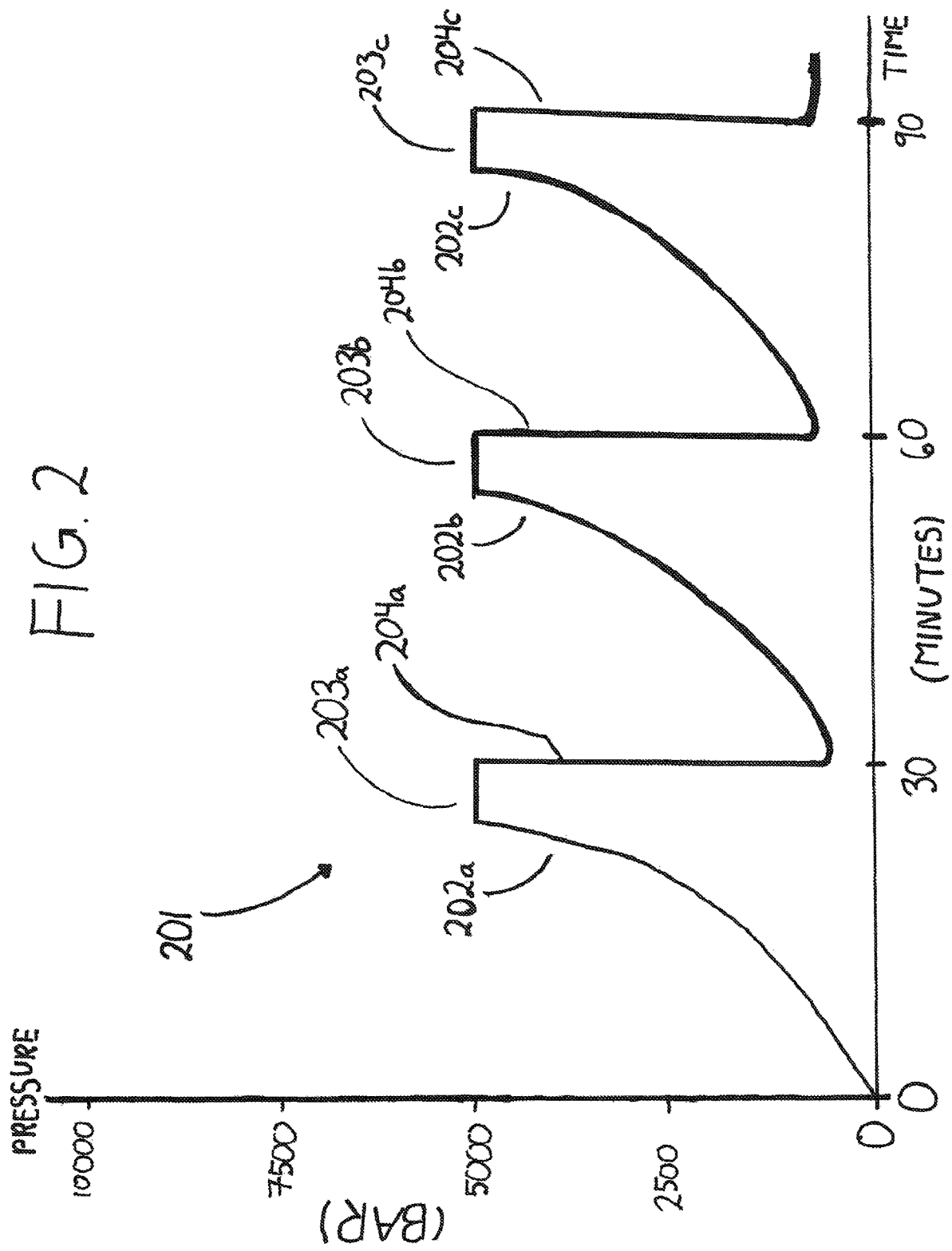

METHOD FOR CAUSING TIRES TO RECYCLE THEMSELVES

BACKGROUND

Used rubber tires have been causing a pollution problem since they replaced the wagon wheel. They are bulky, do not break down on their own, and quickly cause landfills to fill up. On occasion, used tires catch fire and can burn for days or weeks, releasing harmful pollutants both into the atmosphere and into the groundwater.

Some efforts have been made to chop up used tires and reassemble them into a useful product. With glue or heat, chopped tires can be made into floor padding for gyms, machine shops and playgrounds. Chopped tires can be used as mulch or ground cover or they can be used to manufacture sandals, welcome mats and rubber speed bumps. The problem of removing steel belts from tires is difficult to solve, so tires with steel belts may not be suitable for recycling in these applications. Another problem is that making these products from recycled tires costs more than making them from virgin materials, and customers are suspicious that the recycled products may contain carcinogens and other hazardous substances. Therefore, the cost of recycling used tires and public suspicion of them remain issues to be resolved.

Another option for recycling used tires is heat-based pyrolysis. For example, U.S. Pat. No. 8,475,726 for "Reactor and apparatus for pyrolyzing waste, especially tyres" discloses heating used tires to cause them to pyrolize, allowing separation of oils, metal and carbon black. Decades of experimentation with such systems have shown them to be energy-inefficient, resulting in most used tires making their way to landfills. Such systems also have a problem with leaving hazardous materials, including heavy metals, in the recycled material.

An alternative method for recycling used tires is to break down the vulcanized chemical bonds through radio frequency pyrolysis. Such systems in theory hold academic promise but have not proven commercially viable.

Another method for recycling tires employs chemical devulcanization through the addition of diphenyl disulfide and heat to the tires. This system has proven to be dirty, expensive to implement, and creates a substantial pollution problem.

Photo devulcanization processing of used tires is another possibility. In this system, the recycler mixes a photoreactive material with used tires and exposes the photoreactive material to light. The light causes the photoreactive material to build up heat and pyrolize the tire. This method has not been commercially successful due to the problem of chopped used tires being opaque.

Therefore there is a need for a method for recycling used tires which is energy-efficient, does not cause environmental pollution, and deals with the issues of steel in the tires as well as hazardous waste that tire recycling can create.

SUMMARY OF THE INVENTION

A method for causing tires to recycle themselves is provided. The method involves inductively heating tires that contain steel belts the presence of a supercritical reactant to break down the vulcanized chemical bonds. A caustic agent is provided to remove heavy metals and contaminants from the tires. The process occurs in a pressure vessel, or in a refractory chamber.

In this process, hydrocarbon vapors and liquid hydrocarbons are removed from the tires. Those hydrocarbons can be combusted to heat the supercritical reactant. They can also be used to power a generator that provides electricity to an induction coil which is located in proximity to the pressure vessel or refractory chamber, for the purpose of inductively heating the used tires.

At least some of the tires to be recycled will include steel in their presence, such as steel belts found in tires. Tires without steel belts can be mixed in. The induction coil will induce an electric current in the steel belts. The current in the steel belts will experience electrical resistance. The electrical resistance will create heat which heats the rubber of the tire and breaks vulcanized chemical bonds by pyrolysis.

The supercritical reactant penetrates the tires due to heat and pressure present within the pressure vessel or refractory chamber. A supercritical fluid can pass into a solid without requiring a phase change of the solid material. The supercritical reactant, in the presence of heat from induction heating of the steel belts of the tires, aids in the pyrolysis reaction to break vulcanized chemical bonds and release valuable hydrocarbons from tires. Other valuable materials in tires which can be sold when the process is complete include steel and carbon black.

The pressure vessel or refractory chamber can be agitated or rotated to provide mechanical shear to further aid in breaking vulcanized chemical bonds in the tire rubber. Alternatively, the supercritical reactant can be introduced to the used tires through a fluidized bed mechanism in order to improve efficiency of penetration of the supercritical reactant into the used tire material.

When this process has continued for at least a few seconds to a few minutes, the vessel will experience a buildup of hydrocarbon vapors which have value and should be recovered and preserved for later use or sale. The method by which such vapors are removed from the vessel can contribute to tire recycling process efficiency. If the vapors are removed quickly, causing a precipitous decline in vessel interior pressure, then that precipitous decline in pressure vessel interior pressure will cause the supercritical reactant to expand in all directions and quickly exit the used tire material, creating an explosive effect that rips the used tire material apart and further contributes to its breakdown and recycling. The process of pressurizing the vessel and causing supercritical reactant to enter tire material followed by causing a precipitous decline in vessel interior pressure to cause the supercritical reactant to exit the used tire material rapidly with explosive effect can be repeated multiple times, such as 3-5 times, with a single batch of used tires in order to ensure complete breakdown of the used tire material. Induction heating of the tires during each cycle can also be performed because induction heating is so rapid and energy efficient.

The caustic agent used in the invented tire recycling process will bond with heavy metals and other contaminants in the used tires and accumulate at the bottom of the vessel. Carbon black, steel, and liquid hydrocarbons can be removed and separated from the caustic agent that has bonded with contaminants.

In the respect that steel of the tires is used to heat the tires through non-contact induction heating to encourage pyrolysis of the tires, the tires are recycling themselves by heating themselves with their own materials. And when liquid or gaseous hydrocarbons are combusted to heat the supercritical reactant or when they are used to preheat the used tires, it is the case that material from the tires is used to recycle the tires as a further step in the tires recycling themselves. And when the liquid or gaseous hydrocarbons of the tires are used to power a generator that provides electricity to an induction coil that heats the tires by inducing an electrical current in steel belts of the tires, then again it is the material of the tires themselves that is recycling the tires.

BRIEF DESCRIPTION OF THE DRAWINGS

FIG. 1a depicts a coil used to inductively heat tires being recycled.

FIG. 2 depicts a possible pressure curve within the used tire recycling vessel to cause the supercritical reactant to alternately enter tire material where it breaks chemical bonds and then mechanically break up tire material through the explosive force of rapidly exiting the tire material during de-pressurization and reversion of the supercritical reactant to a non-supercritical state.

DETAILED DESCRIPTION OF THE INVENTION

Figure 1:
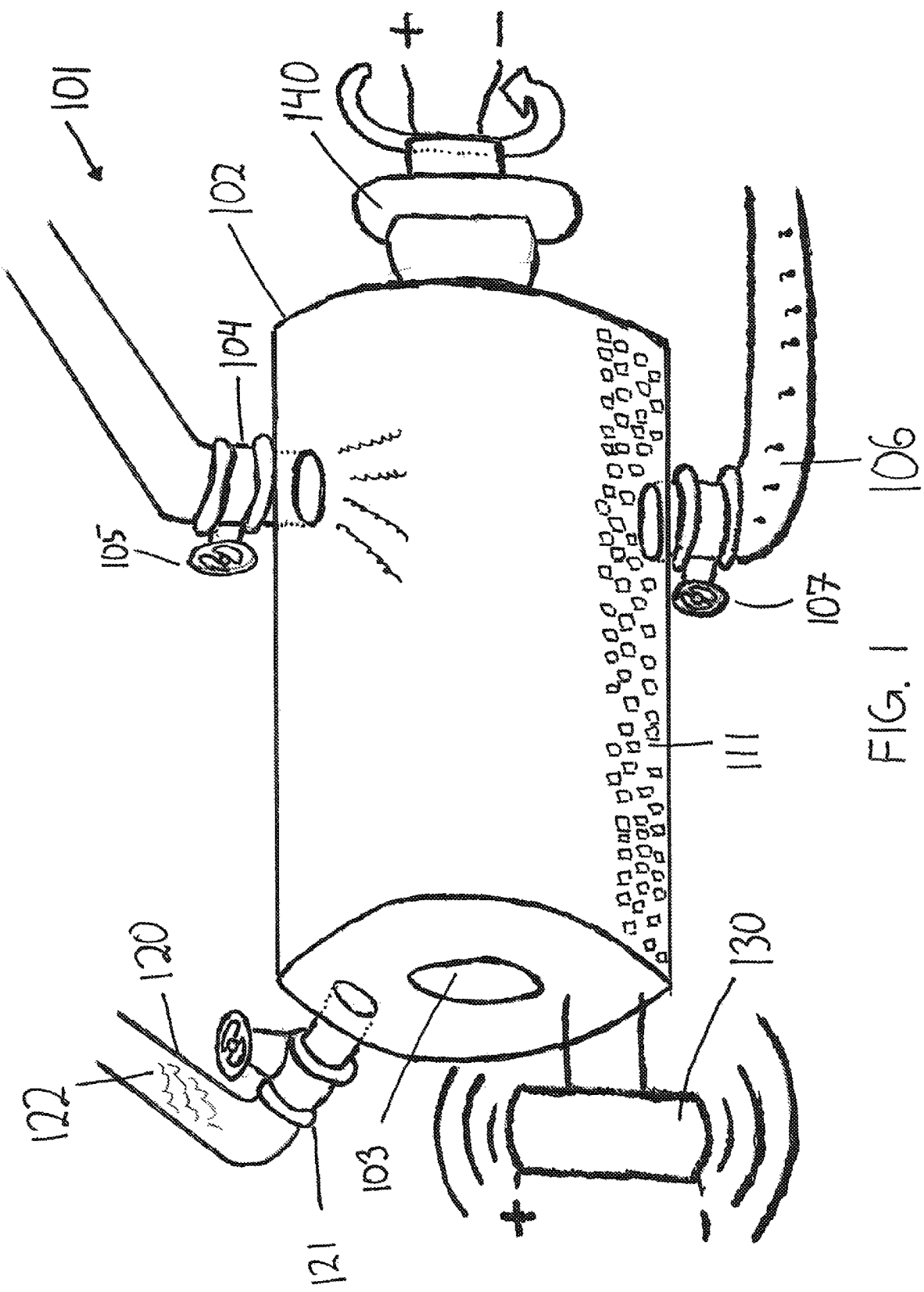
FIG. 1 depicts a vessel in which tires are caused to recycle themselves.

This invention involves the use of components of a used tire, such as the steel found in belts of the tire and hydrocarbons found in the tire, to assist in processes carried out to recycle the tire, thereby causing the tires to recycle themselves.

As a preparatory step, used tires can be cut up or shredded to make them more amenable to handling. Shredded tires can be easily transported into a recycling vessel. Shredded tires can be more easily agitated or tumbled within a recycling vessel. And shredded tires can be treated on a fluidized bed apparatus. Shredded tires are expected to be reduced to particle sizes of not more than 0.25 inches in diameter and preferably not more than 0.125 inches in diameter, although other sizes are possible.

The recycling vessel used in the invented process should be capable of withstanding pressure and heat. The recycling vessel can be described as a pressure vessel or a refractory vessel, and such vessels are already widely available. Some customization may be required to allow for agitation or tumbling of the tire feedstock. For example, agitation mechanisms may require the vessel to be placed on springs. Conversion of the recycling vessel to a tumbling apparatus may require installation of internal blades or baffles on the interior of the vessel and installation of a mechanical or hydraulic drive mechanism on the exterior of the vessel. And implementation of a fluidized bed system to introduce a supercritical reactant to used tires would require installation of a fluidized bed and its feed lines within the recycling vessel. The vessel will also require pipes and valves to remove gaseous hydrocarbons from the top of the vessel and to remove liquid hydrocarbon from the bottom of the vessel. Carbon black, steel and precipitated contaminants can be removed from the bottom of the recycling vessel when processing of a batch of used tires is complete. Carbon black and steel are valuable and can be sold for re-use in tires or other products. The liquid and gaseous hydrocarbons can be stored and sold, they can be used to fuel a generator that powers an induction coil used in the tire recycling process. Alternatively, they can be combusted to heat the supercritical reactant.

Tires are made primarily from vulcanized rubber, carbon black, and steel or fiber belts. Vulcanized rubber, or polyisoprene, is a series of hydrocarbon chains cross-linked with sulphur bonds, other curatives, and accelerators that modify the polymer by forming cross-links between individual polymer chains. Vulcanization substantially improves the durability of rubber, but vulcanized rubber is difficult to recycle due to the strength of the carbon double bonds and cross links.

The invention seeks to break the carbon double bonds and cross links of vulcanized rubber and release the hydrocarbon products contained in tires. This is accomplished by a combination of heat, pressure, and use of a supercritical reactant which effuses into the tire and attacks the bonds. In the initial stage of the reaction, the polysulphide and disulphide bonds are converted to monosulphide bonds. Then the monosulphide bonds are broken. Shear stress can be helpful in this process.

Heat, such as heat created by inductively heating the steel of the tire belts, will cause pyrolysis and break carbon double bonds and cross links. Heat pyrolysis, however, is slow and often incomplete. The invention accelerates breaking of the carbon double bonds and cross links in vulcanized rubber with additional steps, including effusion of supercritical reactants into the tire material where the supercritical reactants assist in breaking carbon bonds and cross links to release hydrocarbons in the tire. Mechanical agitation or tumbling of the tire material adds shear forces to assist in breaking those bonds. And rapid depressurizing of the recycling vessel causes physical destruction of tire material by allowing the supercritical reactants which effused into the tire material to quickly exit the tire material, moving in all directions and tearing the tire material apart through a separate mechanical mechanism.

The invention seeks complete not partial recycling of used tires. Partially-recycled tires are a hazard, creating an expensive disposal problem. To achieve both complete and rapid recycling, a supercritical reactant should be chosen which most rapidly attacks and breaks down the carbon bonds and cross linking found in vulcanized rubber. Supercritical water, which has been evaluated in the prior art, is not the appropriate choice.

The invention uses a supercritical hydrocarbon reactant in the presence of a caustic agent (caustic agents are discussed in detail below). Rather than using supercritical water, which is non-optimal for pyrolysis of tires, the invention uses supercritical unsaturated aliphatic hydrocarbons. Unsaturated aliphatic easily bonds with rubber, vinyl, and other hydrocarbon compounds in used tires, making aliphatic hydrocarbons useful as supercritical reactants. Unsaturated aliphatic hydrocarbons are very reactive, making them especially useful in a pyrolysis process, and facilitating rapid recycling completion. Examples of unsaturated aliphatic hydrocarbons that can be used in the invention include butene, pentene, acetylene, amylene, cycloheptatriene, cyclooctadiene, isobutylene, dipentene, ethylene, hexene, isohexene, isoprene, and methyl pentadiene.

Generally, light oil and heavy oil can also be used as a supercritical reactant. Light oil has an API gravity of at least 22° and a viscosity less than 100 centipoise (cp). Asphaltic, dense (low API gravity), and viscous oil that is chemically characterized by its content of asphaltenes (very large molecules incorporating most of the sulfur and perhaps 90% of the metals in the oil). Although variously defined, the upper limit for heavy oils has been set at 22° API gravity and a viscosity of less than 100 cP.

In order to create conditions in which the supercritical reactant behaves as a supercritical fluid, heat and pressure must be used. A lower level of supercritical conditions maintains pressure above 100 Bar and temperature above 300 degrees Kelvin. Other supercritical liquids require pressure above 1000 Bar and temperature above 350 degrees Kelvin, while yet others require pressure above at least 5,000 Bar but in some cases above 10,000 Bar and temperatures above 400 degrees Kelvin. In the invention, a supercritical reactant has at least two of the three following characteristics. First, at a temperature and pressure above its critical point, so that its distinct liquid and gas phases do not exist, allowing it to reduce in volume and effuse through tire solids. Second, while in the tire solids, the supercritical reactant is cable of breaking chemical bonds in order to break the tire material down so that recoverable materials can be removed from the tire. Third, after the supercritical reactant has been effused into tire solids, the supercritical reactant can be used to explosively break apart the tire solids by precipitously dropping pressure within the recycling vessel, by permitting the supercritical reactant to expand in all directions which breaks the tire solids apart.

The inventor has given theoretical consideration to ionizing the supercritical reactant prior to effusing it into used tire material. An ionized supercritical reactant is believed to operate more quickly to break cross links between polymer chains. A supercritical reactant can be ionized by exposure to an electron beam. An electron beam can be created by implementation of numerous electron gun designs published in the prior art. Care must be taken, however, to prevent electron beam ionization of the supercritical reactant to break down the supercritical reactant before the supercritical reactant effuses into the used tire material and begins to break carbon double bonds and cross link bonds. Experimentation will be needed to tune that process, so it is considered optional at this stage.

In the invention, a caustic agent may be used to address undesirable materials in the tire, such as carcinogens, heavy metals, and other toxic compounds. Failure to do so will result in leaving them in the recycling vessel along with the recovered hydrocarbons and will lead to their eventual release into the atmosphere. A caustic agent can be used to react with various contaminants and heavy metals in used tires to either neutralize them or to cause them to precipitate to the bottom of the recycling vessel, preventing their release into the atmosphere. For example, heavy metals found tires can include Mn, Fe, Co, Ni, Cu, Zn, Cd, and Pb, and when exposed to an appropriate caustic agent, a bond will be formed and the heavy metals will precipitate to the bottom of the recycling vessel.

Carcinogens in tires include polycyclic aromatic hydrocarbons including benzo[ghi]perylene, coronene, indeno[1,2,3-cd]pyrene, benzo[e]pyrene, and benzo[a]pyrene. Removal of these compounds, or chemical conversion to non-hazardous form is desirable. Caustic agents can be used to process those carcinogens by breaking them apart into less harmful compounds, or by bonding with them to create less harmful and less hazardous substance. Separating such dangerous substances from the recovered carbon black and steel from used tires prevents their inclusion in new products based on re-use of those materials. Therefore use of a caustic in the tire recycling process is considered desirable. Selection of the caustic can be optimized if the precise constituents of the used tires are known.

Example caustic agents which can be used in the tire recycling process include sodium hydroxide (NaOH), potassium hydroxide (KOH), calcium hydroxide Ca(OH)2, alkali metals in their elemental form (lithium, sodium, potassium, rubidium, cesium, and francium), alkoxides, metal based, organometallic bases, and any base which includes butyllithium, Ferrocene, Cobaltocene, Tris(triphenylphosphine) rhodium carbonyl hydride, Trimethylaluminium, Dimethylzinc and Trichloroetheneplatinate or any analogue thereof.

Heat is provided to the used tires being processed to encourage pyrolysis. One method for providing heat is to place an induction coil around or in the vicinity of the recycling vessel in which used tires are located so that the steel belts of the tires may be heated by electrical induction. In such a system, an induction coil can be wound about the exterior of the recycling vessel, or it can be placed in the vicinity of the recycling vessel. If the recycling vessel includes iron, then the vessel itself will heat. If the vessel is non-ferrous, then the steel belts of used tires within the vessel will heat. The latter is preferable because heating the steel belts of tires will provide more even and more rapid heating of the material to be recycled.

Induction heating operates by principles similar to those used to create electric motors. When an alternating electrical current is applied to a transformer, an alternating magnetic field is created. When a secondary transformer is located within the magnetic field, an electric current will be induced in the secondary transformer. Resistance within the secondary transformer causes it to heat up. In a simple induction heating assembly, a copper coil is obtained, and a ferrous object is placed inside of the coil. AC current is run through the coil and this creates an alternating magnetic field. The alternating magnetic field induces eddy currents within the ferrous object. The eddy currents flow against the electrical resistivity of the ferrous object, generating precise and localized heat without any direct contact between the coil and the ferrous object. A secondary heating effect is produced within the ferrous object through hysteresis, which can be thought of as internal friction within the metal object.

Induction heating only works on conductive materials, such as most metals. In the case of tires, steel belts (a ferrous material) are conductive and can be inductively heated. Some tires may include condutive materials other than steel belts, and this will enhance the inductive heating effect.

Selection of frequency of the alternating current applied to the induction coil will affect efficiency of induction heating. Frequencies of 100 to 400 kHz are desired for rapid heating, although other frequencies are possible. There is an extensive field of literature on design of induction coils and power supplies, so those details are omitted from this document.

Referring to FIG. 1 and FIG. 1a, an apparatus is depicted which can be used to implement a method for causing tires to recycle themselves. The apparatus 101 includes a recycling vessel 102 which can withstand the heat and pressure of tire recycling operations. The recycling vessel 102 includes an input orifice 103 through which used tire feedstock 111 can be introduced. The recycling vessel 102 has a hydrocarbon vapor removal conduit 104 at its top which can be selectively sealed by a valve 105 and through which liquid hydrocarbon can be removed. The valve 105 may also be opened while the vessel 102 is under pressure to cause a precipitous drop in pressure, if desired. The recycling vessel 102 has a liquid hydrocarbon removal conduit 106 through which liquid hydrocarbons can be removed from the vessel. The conduit 106 has a valve 107 which can be used to seal the vessel 102 when it is under pressure. The recycling vessel 102 is surrounded by or in proximity with an induction coil 110 through which an alternating current AC can be run. The alternating current creates eddy currents (not shown due to electricity not being visible) in conductive material such as steel belts of the used tire feedstock 111. The recycling vessel 102 has a supercritical input orifice 120 and valving 121 through which a supercritical reactant 122 can be introduced to the interior of the recycling vessel 102 and which may be used to raise the interior of the pressure vessel 102 to an appropriate pressure. By use of the induction coil 110 and supercritical input orifice valving 121, interior temperature and pressure of the recycling vessel 102 can be maintained at a level which causes the supercritical reactant to remain supercritical and to effuse into used tire feedstock 111.

An agitator 130 can be used to vibrate the recycling vessel 102 to introduce shear stresses to aid in used tire pyrolysis. Instead of an agitator, a recycling vessel rotation means 140 can be used to rotate the recycling vessel 102 about its horizontal axis and tumble the used tire feedstock 103. If desired, supercritical reactant 122 can be introduced to used tire feedstock 111 through a fluidized bed means (not shown). Fluidized beds are well-known in the prior art and details of their construction are not repeated here. Alternatively, a vessel rotating means 140 can be used to rotate the vessel 102 about its longitudinal axis in order to create shear stress in the used tire feedstock.

When considered as a method, the invention has several simple steps. A quantity of used tires to be recycled are chopped or shredded into appropriately-sized pieces. It is preferable that at least some of the used tires contain steel belts. The tires can be cleaned, dewatered and pre-heated if necessary. Pre-heating can be accomplished in an oven, by blown air including heated air, and by heating through combustion of recovered liquid or gaseous hydrocarbons from used tires. Used tire feedstock results. Each of these additional processes is optional.

Next, used tire feedstock is introduced to the interior of a recycling vessel. A caustic agent and a supercritical reactant are introduced into the vessel. Then the temperature and pressure inside of the recycling vessel is increased above the level necessary to maintain a supercritical state for the supercritical reactant. The used tire feedstock is inductively heated to cause pyrolysis of the used tire feedstock. The supercritical reactant is caused to effuse into the used tire feedstock and break chemical bonds while the caustic attacks heavy metals and other contaminants and hazardous substances to neutralize them or cause them to precipitate to the bottom of the recycling vessel. Shear forces may be introduced by agitating or tumbling the feedstock, or by exposing it to ultrasonic waves created by one or more ultrasonic transducers attached to the recycling vessel. Pressure within the recycling vessel is precipitously dropped to cause supercritical reactant within the used tire feedstock to explosively exit the used tire material, breaking it apart. This step may be repeated. Useful products are recovered from the recycling vessel, including liquid hydrocarbons, gaseous hydrocarbons, carbon black and steel. Those products may be sold or utilized on site. The method may be repeated for other batches of used tire feedstock. If desired, the recycling vessel can be purged before the caustic and supercritical reactant are introduced to the used tire feedstock.

FIG. 2 depicts a possible pressure curve 201 within the used tire recycling vessel of FIG. 1. This pressure curve is used to cause the supercritical reactant to alternately enter tire material in a supercritical state where it breaks chemical bonds, and later breaks up tire material through the explosive force of rapidly exiting the tire material when there is a precipitous drop in recycling vessel interior pressure. Referring to FIG. 2, the vertical axis of the graph shows Pressure within the recycling vessel ranging from 1 BAR to a maximum of 5000 BAR in this example. The horizontal axis of the graph shows time. In this example, pressure of the interior of the recycling vessel increases 202a to 5000 BAR and is held there for a period of time 203a. This causes the supercritical reactant within the recycling vessel to enter a supercritical state and effuse into used tire material where it can break chemical bonds and allow valuable hydrocarbons to exit the used tire feedstock. Then pressure within the recycling vessel I then dropped precipitously 204a back to just above 1 BAR at the 30 minute time mark. This causes supercritical reactant to rapidly exit used tire material, breaking it apart. Again pressure ramps up 202b to cause the supercritical reactant to enter a supercritical state and effuse into used tire feedstock when pressure is kept at that level 203b for a period of time. Inside the used tire feedstock, the supercritical reactant will react with bonds of the tire material. Again, pressure within the recycling vessel drops precipitously 204b at the 60 minute mark causing supercritical reactant to rapidly exit used tire feedstock, tearing it apart. And in a third cycle pressure ramps up 202c to 5000 BAR, is held there 203c and then drops precipitously 204c at the 90 minute mark, again breaking up used tire feedstock material.

The invention may be implemented with one ore more of the steps above omitted, or with new steps added, or with any variation of the structures, materials and processes described in the foregoing pages.

The invention claimed is:

1. A method for causing used tires to recycle themselves comprising the following steps:
   i) obtaining pieces of used tire feedstock that contain a conductive metal,
   ii) obtaining access to a non-conductive recycling vessel capable of withstanding heat and pressure of used tire recycling,
   iii) introducing said used tire feedstock to the interior of said recycling vessel,
   iv) introducing a caustic agent to the interior of said recycling vessel,
   v) introducing a supercritical reactant to the interior of said recycling vessel, said supercritical reactant including an unsaturated aliphatic hydrocarbon,
   vi) powering an induction coil to cause current to flow in said conductive metal of said used tire feedstock by electrical induction and to thereby heat said conductive metal and in turn to heat said used B tire feedstock causing pyrolysis,
   vii) maintaining temperature and pressure within said recycling vessel at a level that keeps said supercritical reactant in its supercritical state,
   viii) causing said supercritical reactant to effuse into said used tire feedstock,
   ix) introducing shear stress to said used tire feedstock,
   x) causing said supercritical reactant to break chemical carbon double bonds in said used tire feedstock,
   xi) causing said supercritical reactant to break cross linked bonds in said used tire feedstock,
   xii) causing gaseous hydrocarbons to exit said used tire feedstock,
   xiii) causing liquid hydrocarbons to exit said used tire feedstock,
   xiv) causing said caustic to precipitate contaminants from said used tire feedstock,
   xv) dropping pressure within said recycling vessel to cause said supercritical reactant to exit said used tire feedstock thereby breaking it apart, and
   xvi) recovering products from said recycling vessel.

2. The method as recited in claim 1 wherein the pressure within said recycling vessel reaches 100 bar and the temperature within said recycling vessel reaches 300 K.

3. The method as recited in claim 1 wherein the pressure within said B recycling vessel reaches 1000 bar and the temperature within said recycling vessel reaches 350 K.

4. The method as recited in claim 1 wherein the pressure within said recycling vessel reaches 5000 bar and the temperature within said recycling vessel reaches 400 K.

5. The method as recited in claim 1 wherein said used tire feedstock includes steel tire belts, and wherein said steel tire belts are inductively heated by eddy currents and hysteresis.

6. The method as recited in claim 1 further comprising the step of using an electron beam to ionize said supercritical reactant.

7. The method as recited in claim 1 wherein said supercritical reactant is introduced to said used tire feedstock by a fluidized bed apparatus.

8. The method as recited in claim 1 wherein said supercritical reactant is selected from the group consisting of butene, pentene, acetylene, amylene, cycloheptatriene, cyclooctadiene, isobutylene, dipentene, ethylene, hexene, isohexene, isoprene, and methyl pentadiene.

9. The method as recited in claim 1 wherein said caustic agent is selected from the group consisting of sodium hydroxide (NaOH), potassium hydroxide (KOH), and calcium hydroxide (Ca(OH)$_2$).

10. The method as recited in claim 1 wherein said caustic agent is a base that contains a material selected from the group consisting of butyllithium, ferrocene, cobaltocene, tris(triphenylphosphine)rhodium carbonyl hydride, trimethylaluminium, dimethylzinc and trichloroetheneplatinate.

11. The method as recited in claim 1 wherein said induction coil is powered b by alternating current having a frequency in a range of 100 to 400 kHz.

12. A method for causing used tires to recycle themselves comprising the following steps:
   i) introducing used tire feedstock which includes steel belt material and a caustic agent to the interior of a non-conductive tire recycling vessel,
   ii) introducing an unsaturated aliphatic hydrocarbon supercritical reactant to the interior of said recycling vessel,
   iii) powering an induction coil with alternating current in a range of 100 to 400 kHz to induce current flow in said steel belt material which in turns heats said steel belt material contained in said used tire feedstock to the point where pyrolysis occurs, said heating of said steel belt material occurring by means of eddy currents and hysteresis,
   iv) maintaining the temperature and pressure within said recycling vessel at a level that keeps said supercritical reactant in its supercritical state,
   v) allowing said supercritical reactant to effuse into said used tire feedstock,
   vi) allowing said supercritical reactant to break chemical bonds in said used tire feedstock, and
   vii) recovering products from said recycling vessel.

13. The method as recited in claim 12 wherein said supercritical reactant breaks both carbon double bonds and cross link bonds in said used tire feedstock.

14. The method as recited in claim 12 wherein the pressure within said recycling vessel reaches 100 bar and the temperature within said recycling vessel reaches 300 K.

15. The method as recited in claim 12 wherein the pressure within said recycling vessel reaches 1000 bar and the temperature within said recycling vessel reaches 350 K.

16. The method as recited in claim 12 wherein the pressure within said recycling vessel reaches 5000 bar and the temperature within said recycling vessel reaches 400 K.

17. The method as recited in claim 15 wherein said supercritical reactant is selected from the group consisting of butene, pentene, acetylene, amylene, cycloheptatriene, cyclooctadiene, isobutylene, dipentene, ethylene, hexene, isohexene, isoprene, and methyl pentadiene.

18. The method as recited in claim 17 wherein said caustic agent is selected from the group consisting of sodium hydroxide (NaOH), potassium hydroxide (KOH), and calcium hydroxide (Ca(OH)$_2$).

19. The method as recited in claim 17 wherein said caustic agent is a base that contains a material selected from the group consisting of butyllithium, ferrocene, cobaltocene, tris(triphenylphosphine)rhodium carbonyl hydride, trimethylaluminium, dimethylzinc and trichloroetheneplatinate.

20. A method for causing used tires to recycle themselves comprising the following steps:
   (i) introducing used tire feedstock with a conductive material into the interior of a non-conductive recycling vessel,
   (ii) introducing an unsaturated aliphatic hydrocarbon reactant to the interior of said recycling vessel, wherein said unsaturated aliphatic hydrocarbon reactant is in its supercritical state at the time of such introduction,
   (iii) powering an induction coil to induce current flow in said conductive material which in turns heats said used tire feedstock to the point where pyrolysis begins to occur,
   (iv) causing said unsaturated aliphatic hydrocarbon reactant to break chemical bonds and crosslinks in said used tire feedstock, and
   (v) recovering products from said recycling vessel.

* * * * *